Patented Oct. 10, 1933

1,929,895

UNITED STATES PATENT OFFICE 1,929,895

SOLDERING FLUX

Frank D. McBride, Philadelphia, Pa., assignor to Berry Solder Co. Inc., New York, N. Y., a corporation of New York No Drawing. Application February 24, 1932, Serial No. 594,957. Renewed August 18, 1933

10 Claims. (Cl. 148—23)

This invention relates to an improvement in soldering flux.

The flux in accordance with this invention may be prepared to have desired consistency within wide limits and may be used generally as a flux in soldering, as a component of a soldering paste composed of the flux and powdered solder, as a core in core solder, etc., etc.

The flux in accordance with this invention will be found to possess a large degree of efficiency in the dissolving of oxidized metal from surfaces to be soldered and in preventing oxidation at soldering temperatures, and in addition will be found to have a capacity for cleaning surfaces to be soldered, and will permit the surface of the metal to remain permanently free from harmful oxides.

The flux in accordance with this invention will comprise essentially hexamethylene-tetramine and a monohydric alcohol ester of abietic acid, and may desirably though not necessarily also include rosin. The flux may be thinned to any desired consistency by the addition of a suitable thinner or solvent, and various additional ingredients may be added if desired.

The components of the flux may be present in widely varying proportions and it will be understood that this invention is not limited to their presence in any particular proportions. As illustrated, for example, the monohydric alcohol ester of abietic acid may be desirably present within about the range 99–75%, by weight, with hexamethylene-tetramine within about the range 1–25%, by weight, or when rosin is also included such may be present in amount within about the range 50–97%, by weight, with hexamethylene-tetramine within about the range 1–25%, and with a monohydric alcohol ester of abietic acid within about the range 2–20%.

For the preparation of a flux in accordance with this invention the hexamethylene-tetramine may be of commercial grade. The monohydric alcohol ester of abietic acid, which may be prepared by esterifying wood or gum rosin, or abietic acid, with a monohydric alcohol, may for example be ethyl abietate, methyl abietate, butyl abietate, propyl abietate, etc., etc. The rosin may be wood or gum rosin.

As illustrative of the practical embodiment of this invention, a satisfactory flux may be prepared, for example, in accordance with the following formulae:

|  | No. 1 | No. 2 |
|---|---|---|
|  | Percent by weight | Percent by weight |
| Hexamethylene-tetramine | 5 | 5 |
| Ethyl abietate | 95 | 10 |
| Rosin |  | 85 |
|  | 100 | 100 |

In preparing the flux in accordance with formulae No. 1, above, the ethyl abietate and hexamethylene-tetramine are mixed together and heated to a temperature say about 300° F., at which the hexamethylene-tetramine will become dissolved in the abietate. In preparing the flux in accordance with formulae No. 2, above, the rosin and hexamethylene-tetramine will be heated together at a temperature at which the rosin will be melted, but not above about 350° F., say a temperature of about 300° F., until the hexamethylene-tetramine becomes dissolved in the rosin. The temperature is then lowered to about 200° F. and the ethyl abietate added.

The flux may be used as prepared or if desired it may be thinned by the addition of, for example, a suitable solvent or thinner, as an alcohol, a light paraffine oil, turpentine, etc., etc. The amount of solvent or thinner will be dictated by the consistency desired for the flux.

If desired, other ingredients may be included in the flux without departing from this invention.

In use, the flux in accordance with this invention will be highly efficient in protecting metal surface from oxidation during soldering and at the same time will act to clean surfaces to be soldered due to the alcohol radical of the abietate which will not be dissipated below the soldering temperature and which will act, for example, to dissolve traces of rubber compound from the surfaces of wires to be soldered. Also the flux leaves a residue that has no corrosive effect on the metals and is a perfect nonconductor.

One class of ingredients which may be added to soldering fluxes, not only of the present type but also of other types, includes substances which when heated will volatilize with the production of vapors having pleasant odors which mask the unpleasant odors resulting from the thermal volatilization or decomposition of the components of the flux. Such substances may include the natural essential oils, such as oil of wintergreen or oil of cloves, or the synthetic aromatic oils or perfumes which for the purposes of this invention may be regarded as equivalents of the natural essential oils. The amounts of the aromatic substances used depend on the effects desired. In general, however, only small quantities are required. The only characteristics necessary for these substances aside from their odors are resistance to any decomposition destructive of its aromatic properties and absence of effect upon the solder or materials being soldered, either during or after the soldering process.

What I claim and desire to protect by Letters Patent is:

1. A soldering flux including hexamethylene-tetramine in amount ranging from 1 to 25% by weight and a monohydric alcohol ester of abietic acid.

2. A soldering flux including hexamethylenetetramine 1–25% by weight and a monohydric alcohol ester of abietic acid 99–75% by weight.

3. A soldering flux including hexamethylenetetramine in amount ranging from 1 to 25% by weight and ethyl abietate.

4. A soldering flux including hexamethylenetetramine in amount ranging from 1 to 25% by weight and methyl abietate.

5. A soldering flux including hexamethylenetetramine in amount ranging from 1 to 25% by weight, rosin, and a monohydric alcohol ester of abietic acid.

6. A soldering flux including hexamethylenetetramine in amount ranging from 1 to 25% by weight, rosin and ethyl abietate.

7. A soldering flux including hexamethylenetetramine 1–25% by weight, rosin 50–97% by weight and a monohydric alcohol ester of abietic acid 2–20% by weight.

8. A soldering flux including hexamethylenetetramine 1–25% by weight, rosin 50–97% by weight and ethyl abietate 2–20% by weight.

9. A soldering flux including hexamethylenetetramine about 5% by weight and a monohydric alcohol ester of abietic acid about 95%.

10. A soldering flux including hexamethylenetetramine about 5% by weight and ethyl abietate about 95%

FRANK D. McBRIDE.